US007588279B2

United States Patent
Rasmussen

(10) Patent No.: US 7,588,279 B2
(45) Date of Patent: Sep. 15, 2009

(54) SLIDE-OUT MECHANISMS AND SYSTEMS

(75) Inventor: C. Martin Rasmussen, Fruit Heights, UT (US)

(73) Assignee: Lippert Components, Inc., Goshen, IN (US)

( * ) Notice: Subject to any disclaimer, the term of this patent is extended or adjusted under 35 U.S.C. 154(b) by 294 days.

(21) Appl. No.: 11/421,404

(22) Filed: May 31, 2006

(65) Prior Publication Data

US 2006/0273606 A1    Dec. 7, 2006

Related U.S. Application Data

(60) Provisional application No. 60/697,045, filed on Jul. 6, 2005, provisional application No. 60/686,085, filed on May 31, 2005.

(51) Int. Cl.
*B60P 3/34* (2006.01)
(52) U.S. Cl. .................. 296/26.13; 296/26.12
(58) Field of Classification Search ............ 296/26.01, 296/26.08, 26.09, 26.12, 26.13, 173, 176
See application file for complete search history.

(56) References Cited

U.S. PATENT DOCUMENTS

| 6,345,854 | B1 * | 2/2002 | McManus ................. 296/26.13 |
| 6,575,514 | B2 * | 6/2003 | McManus et al. ......... 296/26.01 |
| 7,258,382 | B2 * | 8/2007 | Kunz et al. .............. 296/26.13 |
| 2002/0078634 | A1 * | 6/2002 | McManus et al. ........... 296/175 |
| 2005/0035627 | A1 * | 2/2005 | Garceau et al. ............ 296/165 |
| 2006/0117673 | A1 * | 6/2006 | McManus et al. .............. 52/67 |
| 2006/0237982 | A1 * | 10/2006 | Garceau et al. .......... 296/26.13 |

* cited by examiner

*Primary Examiner*—Lori L Lyjak
(74) *Attorney, Agent, or Firm*—Barnes & Thornburg, LLP

(57) ABSTRACT

A vehicle such as a recreational vehicle includes a slide-out portion such as a slide-out compartment, slide-out patio, etc that moves between a retracted position and an extended position to increase the living space in the vehicle. The slide-out portion includes a second floor that is positioned adjacent to a main floor when the slide-out portion is retracted. A slide-out mechanism is used to move the second floor between the retracted position and the extended position. The second floor may be at least substantially flush with the main floor when the slide-out portion is in the extended position.

14 Claims, 14 Drawing Sheets

SLIDE-OUT MECHANISMS AND SYSTEMS

CROSS-REFERENCE TO RELATED PATENT APPLICATIONS

This patent application claims priority to: (1) U.S. Prov. Pat. App. Ser. No. 60/686,085, entitled "Slide-Out Mechanisms and Systems," filed on May 31, 2005 and (2) U.S. Prov. Pat. App. Ser. No. 60/697,045, entitled "Slide-Out Mechanisms and Systems," filed on Jul. 6, 2005, all of which are incorporated by reference herein in their entireties. This patent application also incorporates the following patent applications by reference herein in their entireties: (1) U.S. Pat. No. 6,976,721, entitled "Slide-out Mechanisms and Systems," filed on Mar. 5, 2004, issued on Dec. 20, 2005, (3) U.S. Prov. Pat. App. No. 60/452,247, entitled "Sliding Mechanisms and Systems," filed on Mar. 5, 2003, and (4) U.S. Pat. No. 6,981,728, entitled "Sliding Mechanisms and Systems," filed on Dec. 2, 2002, issued on Jan. 3, 2006. It should be understood that the components, features, mechanisms, and/or systems described in any of the documents which are incorporated by reference herein can be used in any foreseeable/desirable/readily recognized combination with the subject matter described herein. It should also be appreciated that any description of the same component or a similar component in any of the documents which are incorporated by reference herein also applies equally to the component shown or described herein.

BACKGROUND

Recreational vehicles (RVs), such as travel trailers, fifth wheels, campers, various other types of trailers, motor homes, and the like, offer users the opportunity to escape the rigors of everyday life and explore the world we live in. In some cases, resembling a small home on wheels, RVs are capable of transporting and comfortably sheltering people for extended periods. One benefit of such an RV is to enhance the camping or traveling experience by providing the comforts of home away from home. Additionally, the occupant is given the option of braving the elements, commonly known as "roughing it," or retreating to the protection afforded by the RV. Thus, the spirit of "roughing it" may be maintained without deprivation of the full camping experience.

Although freely mobile, as the size of RVs increase, the ease of handling tends to decrease. Additionally, RVs often have dimensional limits dictated by highway regulations. Further, other factors may limit the size of the RV (e.g., the capacity of the tow vehicle used to tow towable RVs or the engine size in motorized RVs). Responding to the need for more living space inside RVs, various RVs incorporate features such as pop-up tops and/or slide-out rooms for selectively expanding the living area. Designed to be used primarily when the RV is parked, these rooms are typically positioned in the interior of the RV during travel, and are moved outwardly when the RV is parked. Upon parking the RV, the slide-out rooms or compartments are moved horizontally to an extended position to increase the useable interior space of the vehicle.

As the size of RVs increase, there is a continual push to reduce the weight of the RV to be within the weight limits of the vehicle used to tow the RV in the case of towable RVs or within the weight limits of the chassis and engine in the case of motorized RVs. One way to reduce the overall weight of the RV is to reduce the size and/or weight of the frame. Frames are being used which are smaller, lower to the ground, and have excess structural material removed through the use of strategically placed holes in the frame members.

The use of lightweight frames has presented a number of challenges to providing a suitable slide-out system that can be coupled to the frame and used to move the slide-out room between the extended and retracted position. In conventional systems, a hole is cut through the frame rails of the RV so that the slide-out system can pass through and be mounted to the frame rail. However, because excess structural material has already been removed from lightweight RV frames, cutting an additional hole in the frame may significantly weaken the frame—even to the point of failure.

The challenges stemming from the use of a lightweight frame are more pronounced when the slide-out system is used to provide a flush floor slide-out room—i.e., the slide-out room and the interior of the RV have a flush floor when the slide-out room is extended. Conventional slide-out systems are able to create a flush floor slide-out room by sloping the system used to move the slide-out room downward. However, such a system may be unsuitable for use with lightweight frames because the pre-existing holes in the frame rails may not accommodate the sloped shape of the slide-out system. Furthermore, since many lightweight systems sit closer to the ground, the sloped shape of the slide-out system may cause the slide-out system to be unduly close to the ground when the slide-out compartment is extended. Also, the range of travel is limited to some degree because the sloped shape of the slide-out system makes it difficult, if not impossible, for the slide-out system to pass through a hole in the frame rails on both sides of the RV. A slide-out system that could pass through holes in both frames rails would allow the slide-out compartment to move outward a larger distance.

Further challenges arise in stopping the slide-out compartment in the retracted position or the extended position so that the slide-out compartment provides a suitable seal with the fixed wall of the RV but does not apply so much pressure to the side wall of the RV that it may cause structural fatigue or other problems. Conventional slide-out systems often use universal circuit breakers (UCB) to stop the movement of the slide-out compartment. When the slide-out compartment contacts the fixed wall of the RV, the current draw to the motor increases to the point that it trips the UCB. Unfortunately, this system suffers from a number of problems. Slide-out compartments may vary significantly in weight so that one UCB may be appropriate for one slide-out compartment, but be too small or large for another slide-out compartment. This may be true even if the size of the slide-out compartment remains the same but the particular floor plan is different (e.g., one floor-plan may have two recliners in the slide-out compartment and another floor plan may have only one). In cold weather, the lubricants in the motor and the slide-out system may be more viscous resulting in greater friction and greater current draw by the motor, which may trip the UCB unnecessarily. In hot weather, the opposite problem may be present in that the UCB may not be tripped until the slide-out compartment has put too much pressure on the fixed walls of the RV. Accordingly, it would be desirable to provide an improved way of stopping the slide-out compartment in the retracted and/or the extended position.

It should be appreciated that the claims define the scope of the subject matter for which protection is sought, regardless of whether any of the aforementioned disadvantages are overcome by the subject matter recited in the claims. Thus, a claim should not be interpreted to be limited to a particular embodiment due to the previous discussion of some of the shortcomings of conventional slide-out systems, especially since, in many situations, conventional slide-out systems suffered from multiple drawbacks, not all of which (or even any of which) may be alleviated using the claimed subject matter.

DRAWINGS

Various embodiments of apparatuses and methods for moving items in a vehicle are described in greater detail by reference to the appended drawings. Understanding that these drawings depict only a few exemplary embodiments, the subject matter disclosed herein is described with the assistance of the accompanying drawings in which.

DETAILED DESCRIPTION

Figure 1:
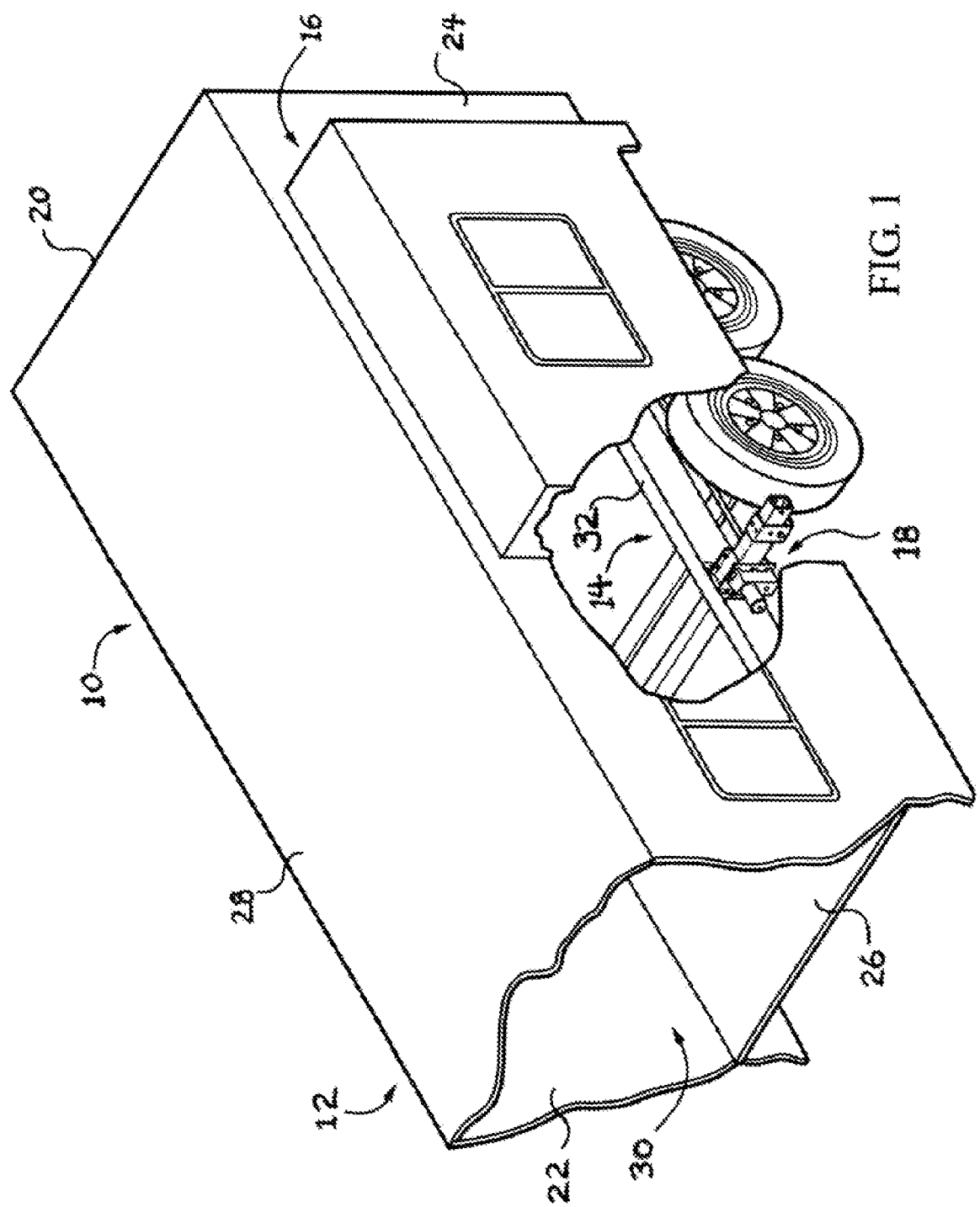
FIG. 1 is a partial sectional perspective view of a vehicle which includes a slide-out compartment.

The subject matter described herein generally relates to slide-out mechanisms and systems which may be used to extend and/or retract a slide-out floor, a slide-out room, a slide-out compartment, and/or a slide-out portion of a vehicle such as a land vehicle. The following description is provided in the context of slide-out systems for recreational vehicles (RVs), including, but not limited to, truck campers, travel trailers, tent trailers, fifth wheels, motor homes, toy haulers, or other conveyances that transport people, objects or things. However, it should be appreciated that the slide-out systems described herein may be used in any of a number of suitable vehicles. Also, although the subject matter described herein is presented in the general context of frame mounted slide-out mechanisms and systems, it should be understood that many features and concepts are also applicable to above-the-floor slide-out mechanisms and systems (e.g., bed slide-out system, sofa slide-out system, entertainment center slide-out system, etc.). Also, it should be understood that one or more features, characteristics, and components of one embodiment may be combined with other embodiments described herein to provide additional embodiments unless noted otherwise.

The slide-out systems described herein may be used to extend and retract variously sized slide-out compartments to increase the living space within an RV. Also, the slide-out systems may be used to extend and retract variously sized slide-out decks or slide-out patios to increase the amount of usable space on the outside of the RV. Moreover, the slide-out systems may be used to extend and/or retract other slide-out portions of an RV as would be recognized by one of ordinary skill. Although reference is made herein to a single slide-out compartment or slide-out patio, one skilled in the art will appreciate that multiple combinations of slide-out compartments and/or slide-out-patios may be incorporated within a single recreational vehicle.

The slide-out systems described herein may be especially useful in combination with "lightweight" frames such as those shown in U.S. Pat. No. 6,854,793, which is incorporated by reference herein in its entirety. Lightweight frames are referred to as such because they typically minimize the amount of steel and other materials used but still have the requisite strength for the particular application. One way that the amount of steel can be reduced is to provide strategically placed holes in the frame rails. The holes may each have a lip which is raised relative to the generally planar surface of the frame rail (e.g., edges of holes are rounded or bent outwards) to provide increased strength to the frame. The holes in each frame rail are typically similar or identical in size and positioned opposite each other in the frame rails. Lightweight frames may also use torsion axles between the wheels to further reduce the weight of the frame. It should be appreciated that the slide-out systems may also be used with any suitable frame regardless of whether it is considered lightweight or not.

The slide-out systems are capable of being installed on various RVs and at varying locations on the RV. Accordingly, the slide-out systems are interchangeable or may be used with or without modification for slide-out compartments and/or slide-out patios on the right, left, front, or rear of the RV. Each slide-out system may include one, two, three, or more slide-out mechanisms as described herein.

Referring to FIG. 1, a portion of an RV 10 is shown according to an exemplary embodiment. RV 10 includes a main body 12, a frame or support structure 14 which supports the main body 12, a slide-compartment 16, and a slide-out system 18 that is configured to support and move slide-out compartment 16. RV 10 is capable of moving between a first configuration (e.g., travel configuration, retracted configuration, etc.) where the slide-out compartment 16 is substantially retracted within the main body 12 and a second configuration (e.g., use configuration, extended configuration, etc.) where the slide-out compartment 16 is extended outward from the main body 12.

The main body 12 comprises a rear wall or rear portion 20, a front wall or front portion (not shown) that is generally parallel to rear wall 20, a first wall or first side portion 22 that is generally perpendicular to rear wall 20, a second wall or second side portion 24 that is generally parallel to first wall 22, a first floor or main floor 26 that is generally horizontal and perpendicular to walls 20, 22, 24, and a ceiling 28 (e.g., roof, overhead portion, etc.). Main body 12 defines a main occupancy area 30. According to one embodiment, RV 10 includes a hitch (e.g., ball hitch, goose neck hitch, etc.) coupled to the front portion that cooperates with a component on a vehicle to couple RV 10 to the vehicle. In other embodiments, such as motor homes, RV 10 may comprise its own drive system (e.g., engine, transmission, drive train, etc.) to propel RV 10.

It should be noted, that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Referring to FIGS. 4-7, the frame 14 is shown. Frame 14 is coupled to the main floor 26 and is used to support main floor 26 as well as the overall body 12 of RV 10. Frame 14 comprises a first frame rail or first frame member 32, a second frame rail or second frame member 34, and cross-frame rails 36. First and second frame rails 32, 34 generally extend lengthwise relative to RV 10 underneath main body 12. First frame rail 32 and second frame rail 34 each include a plurality of holes or openings 37 which are provided to decrease the weight of frame 14. Cross frame rails or cross frame members 36 extend between the first and second frame rails 32, 34 at various locations to provide a suitably strong support structure for main body 12. According to an exemplary embodiment, cross frame rails 36 extend through holes 37 in first and second frame rails 32, 34. Cross frame rails 36 may be coupled to first frame rail 32 and second frame rail 34 using mounting brackets or members 38. It should be appreciated that the remainder of the RV 10 may be coupled to the frame 14 in a conventional fashion.

According to an exemplary embodiment, second wall 24 and main floor 26 of RV 10 are adapted to receive or cooperate with slide-out compartment 16 as it moves between a first position or retracted position and a second position or extended position. Slide-out compartment 16 (e.g., slide-out room, sliding compartment, moveable compartment, etc.) comprises a slide-out floor 40 or a second floor, a slide-out wall or third wall 42, and a slide-out ceiling 44. Slide-out compartment 16 moves between the retracted position where third wall 42 is positioned adjacent to second wall 24 of RV 10 and the extended position where third wall 42 is positioned outwardly at a distance from second wall 24. In the first position, third wall 42 forms a seal with second wall 24 to impede moisture, dirt, etc. from entering main occupancy area 30. The seal between third wall 42 and second wall 24 may be created using any number of suitable sealing materials 46 (e.g., compressible rubber material) and/or techniques (e.g., weather stripping material on one or both the slide-out wall and the fixed wall, etc.). In the extended position, flanges around slide-out ceiling 44 and the lateral walls of slide-out compartment 16 engages and forms a seal 46 with the inside of second wall 24.

Figure 2:
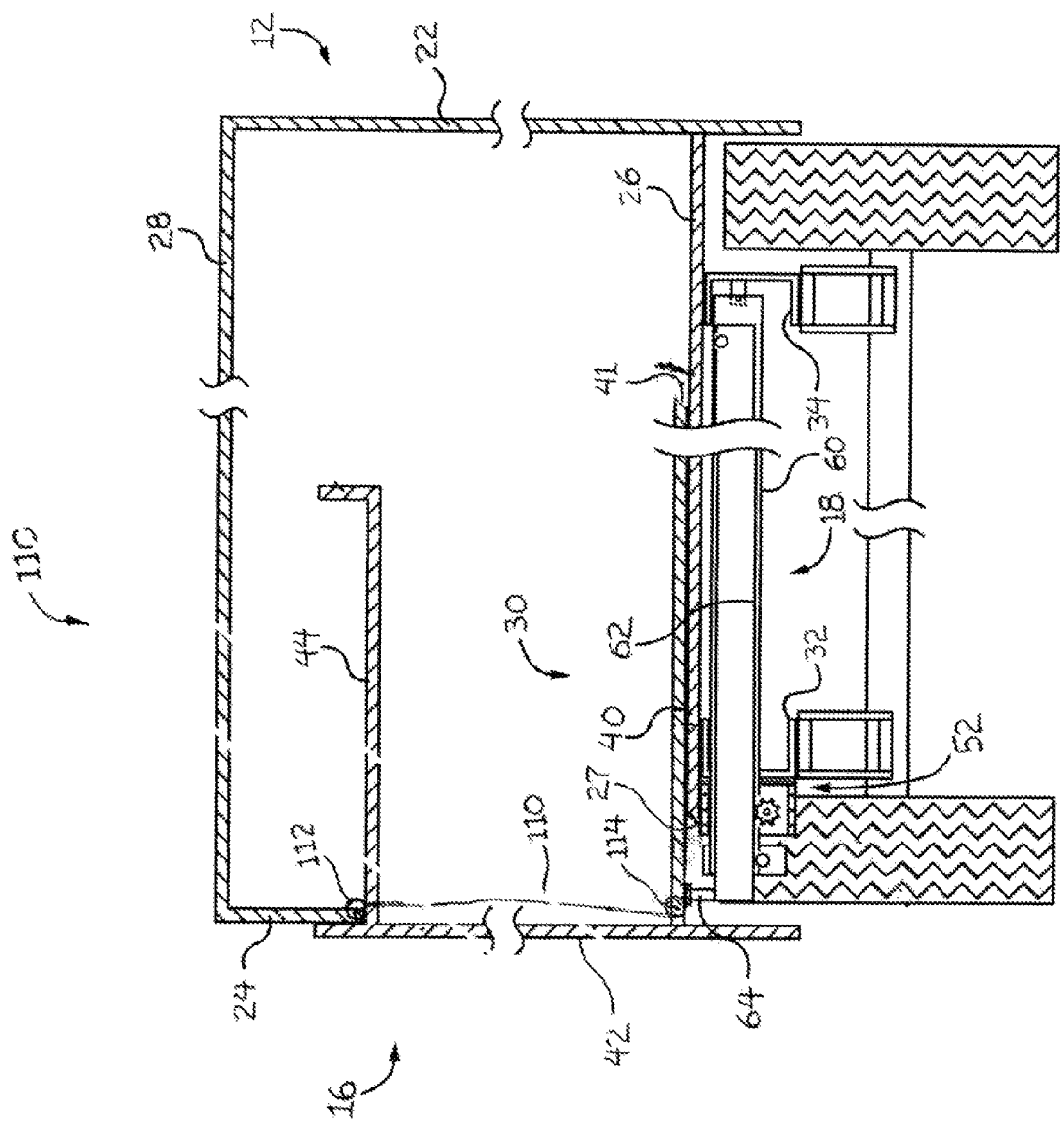
FIG. 2 is a cross-sectional rear elevation view of the vehicle of FIG. 1 showing one embodiment of a slide-out system in a retracted position.
Figure 3:
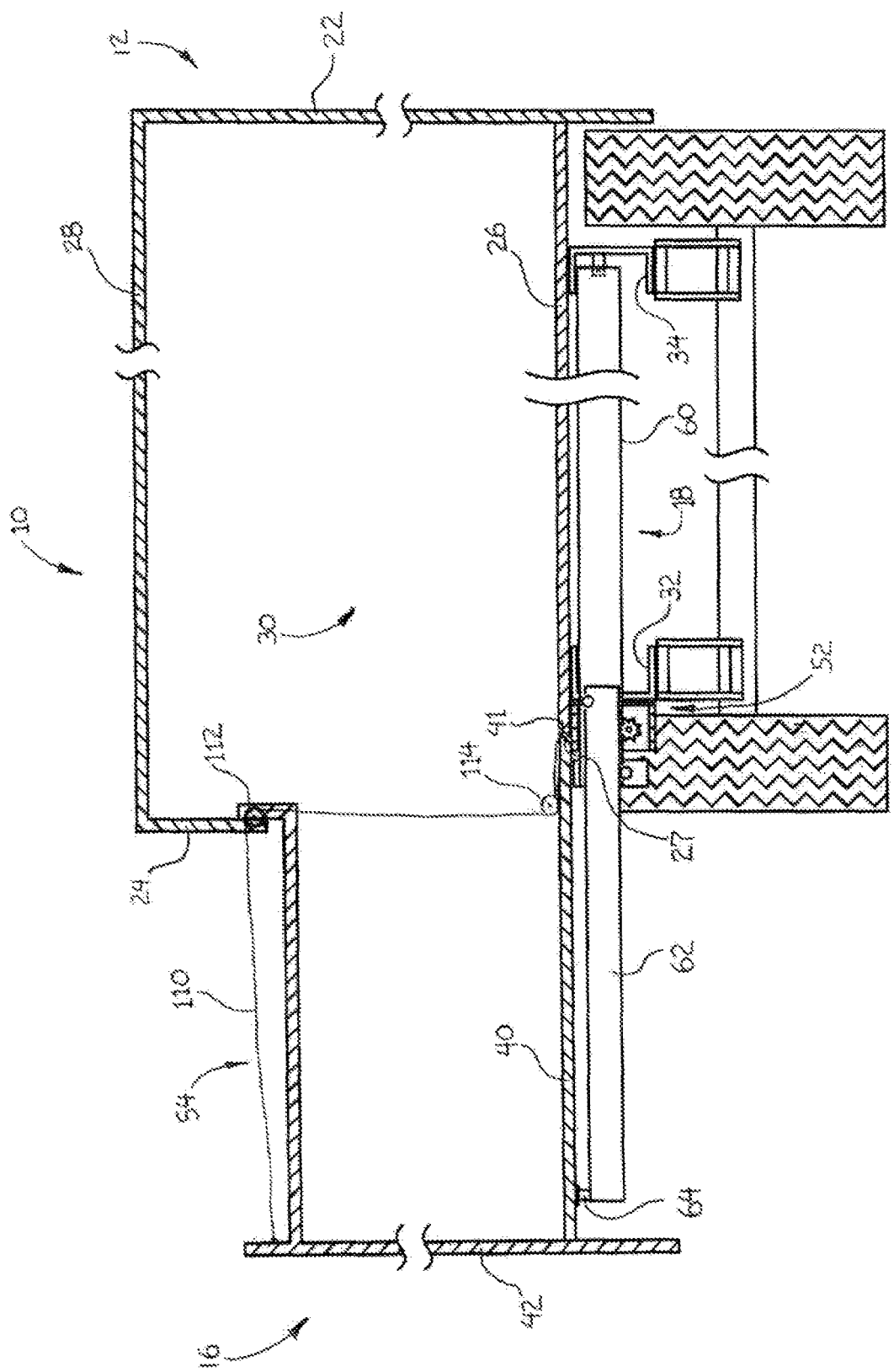
FIG. 3 is a cross-sectional rear elevation view of the vehicle of FIG. 1 showing the slide-out system in an extended position.
Figure 4:
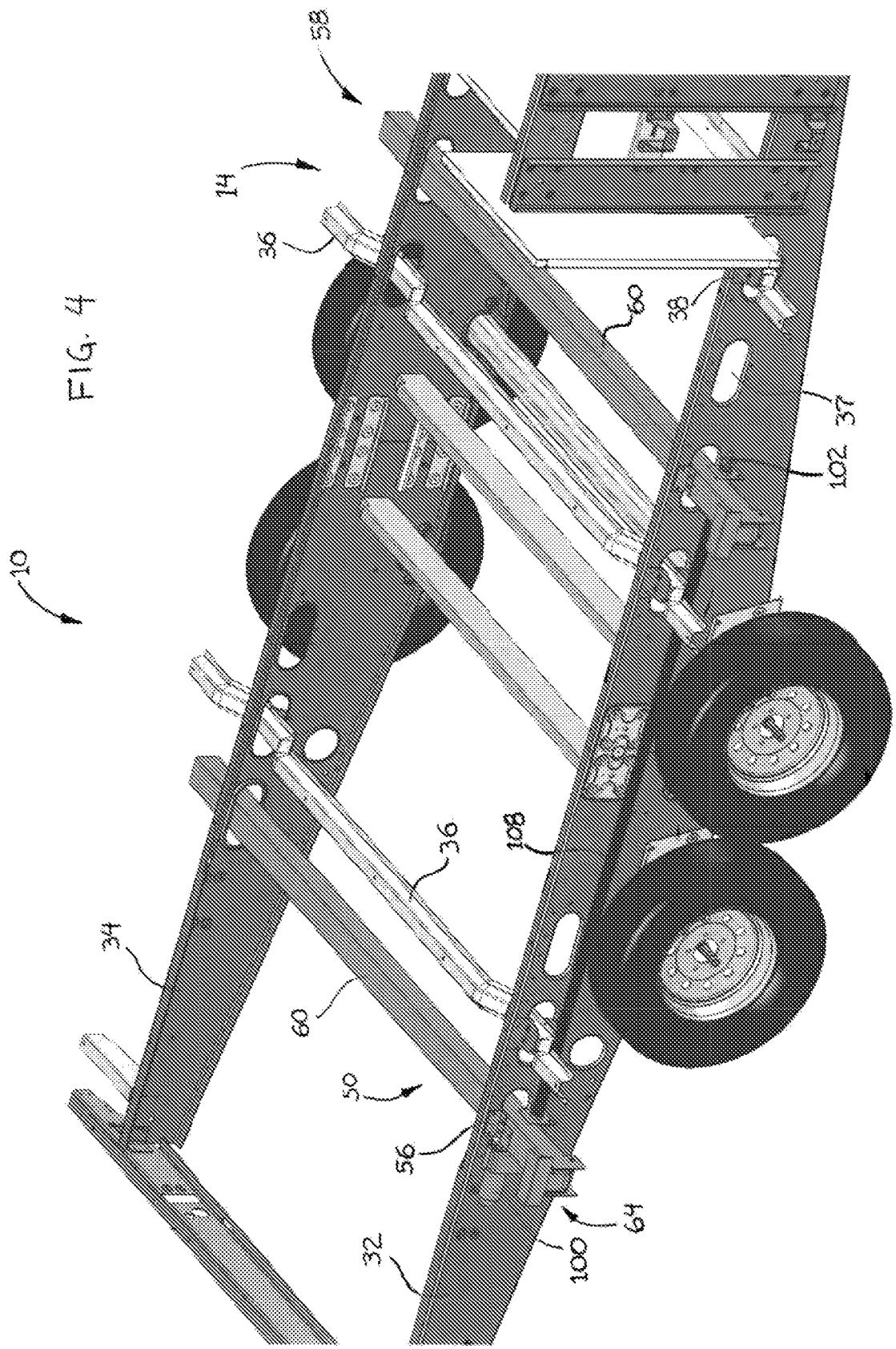
FIG. 4 is a perspective top view of a frame of a vehicle showing a portion of a slide-out system according to one exemplary embodiment.
Figure 5:
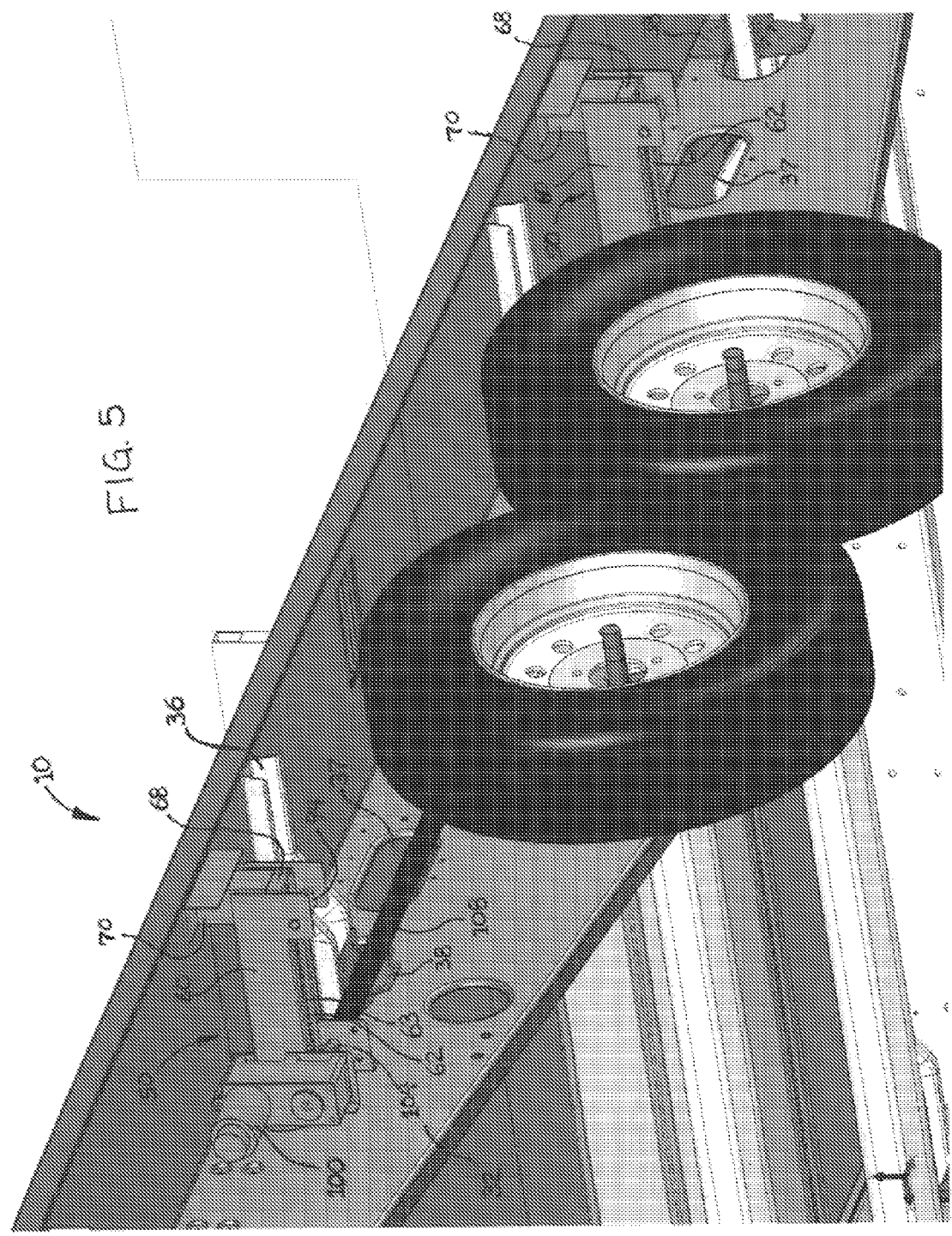
FIG. 5 is a perspective bottom view of the frame of FIG. 4 showing the slide-out system.
Figure 6:
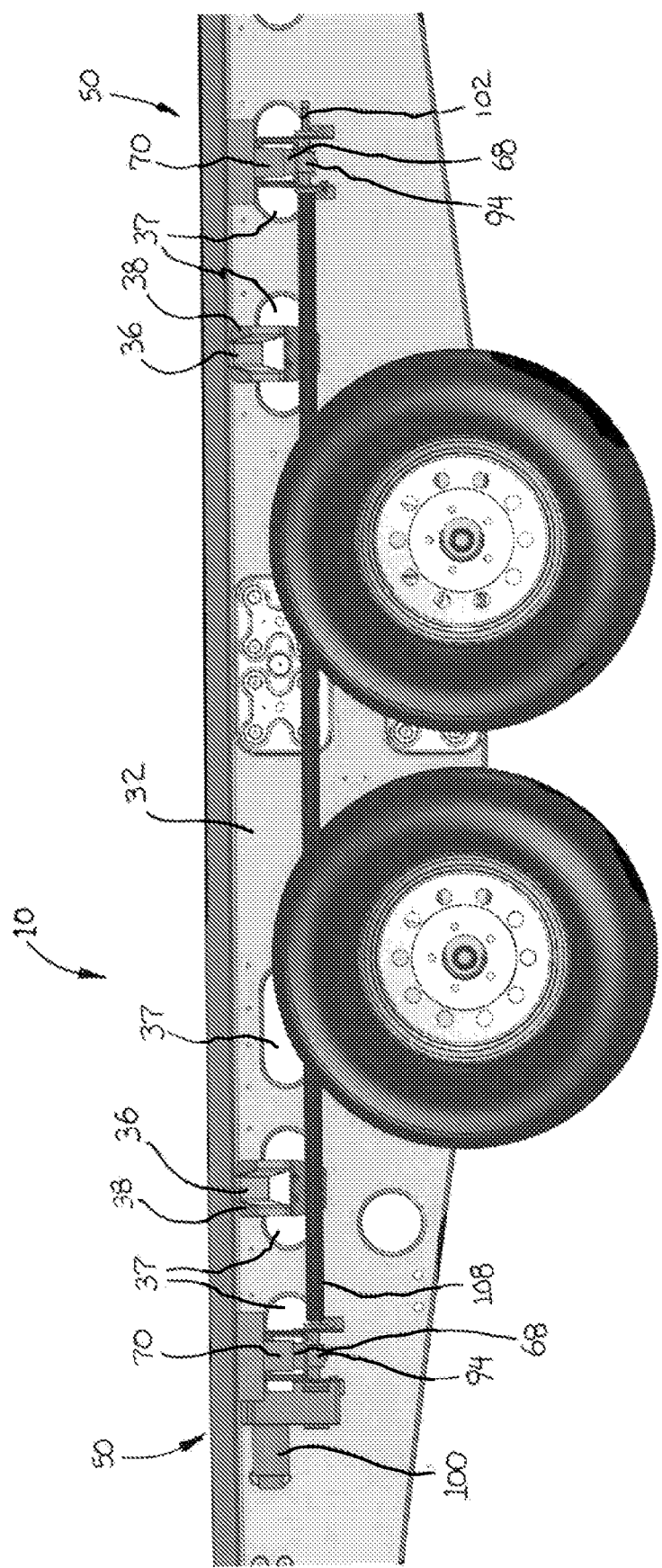
FIG. 6 is a side view of the frame of FIG. 4.
Figure 7:
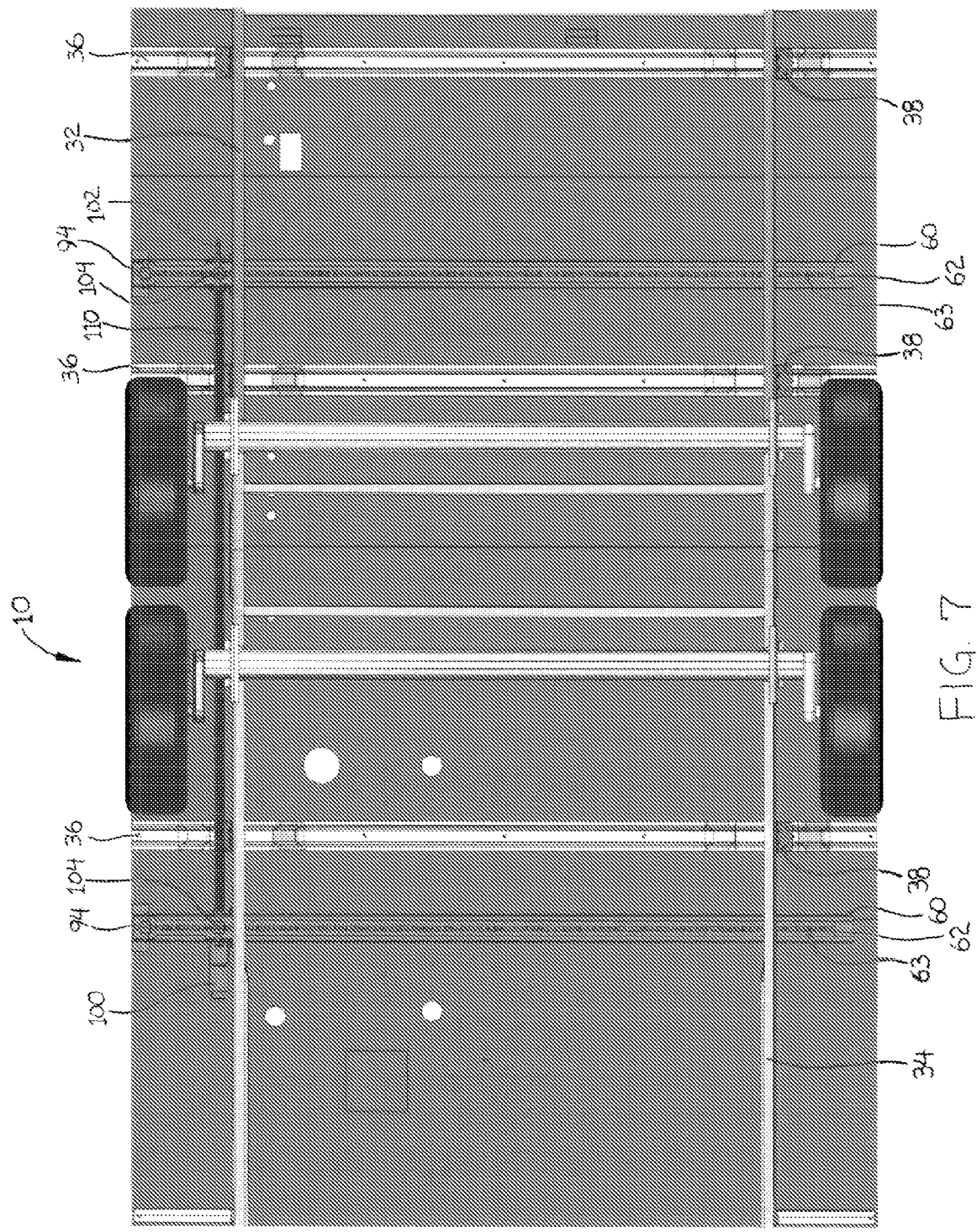
FIG. 7 is a bottom view of the frame of FIG. 4.

Referring now especially to FIGS. 2-3, slide-out compartment 16 is shown in a retracted position and in an extended position. Slide-out floor 40 is positioned adjacent to and on top of main floor 26 when slide-out compartment 16 is in the retracted position and slide-out floor 40 is substantially level or flush with main floor 26 to form a continuous surface when slide-out compartment 16 is in the extended position. According to an exemplary embodiment, main floor 26 includes a tapered end 27 (e.g., sloped end, beveled end, etc.) and slide-out floor 40 includes a tapered end 41 that is generally similar to tapered end 27 on main floor 26. When slide-out compartment 16 is in an extended position, tapered ends 27, 41 cooperate to provide a substantially continuous and level floor which is made up of at least main floor 26 and slide-out floor 40. When slide-out compartment 16 is moved from an extended position to a retracted position, tapered end 41 of slide-out floor 40 slides over tapered end 27 of main floor 26, thus reducing any binding that may occur between main floor 26 and slide-out floor 40. Tapered ends 27, 41 provide ramped surfaces that allow slide-out floor 40 to move from a position that is generally level with main floor 26 when slide-out compartment 16 is in an extended position to a position above main floor 26 when slide-out compartment 16 is in a retracted position. According to other exemplary embodiments, the transition between slide-out floor 40 being substantially level with main floor 26 to slide-out floor 40 being positioned above main floor 26 may be accomplished in a number of suitable ways. According to still other exemplary embodiments, slide-out floor 40 may further comprise one or more rollers that are configured to assist slide-out floor 40 in moving across main floor 26 or to minimize or damage to main floor 26.

Slide-out system 18 is configured to move slide-out compartment 16 between a retracted position and an extended position and includes one or more generally parallel slide-out mechanisms 50, a drive assembly 52 that lengthens and shortens slide-out mechanisms 50, one or more take-up assemblies that move slide-out compartment 16 vertically and a stop position adjustment assembly 76. Although FIGS. 4-7 show a slide-out system 18 comprising two slide-out mechanisms 50, one or more than two slide-out mechanisms 50 may also be used.

With continued reference to the FIGS. 4-9, slide-out mechanism 50 includes a first support member 60 (e.g., stationary member, guide member, outer member, etc.), a second support member 62 (e.g., movable member, sliding member, inner member, etc.), a mounting assembly 64, a stop position adjustment assembly 76, and a support assembly or roller assembly 94. Slide-out mechanisms 50 cooperate with first frame rail 32, second frame rail 34, and slide-out floor 40. According to various exemplary embodiments, slide-out mechanism 50 may be coupled to one or more of first frame rail 32, second frame rail 34, cross frame rails 36, underside of body 12 (e.g., underside of main floor 26, cross members or joists (not shown) that are part of the framing for body 12 and may be used to support main floor 26, etc.), and/or a lower surface of slide-out floor 40. For clarity purposes, it should be noted that the mounting assembly 64 is not coupled to main floor 26 in FIGS. 4-7. Rather, the mounting assembly 64 is detached from the main floor 26 and the first mounting member 68 is fully telescoped inside the second mounting member 70.

According to one exemplary embodiment, first support member 60 is a thin walled member with a generally C-shaped cross-section and cooperates with first frame rail 32, the second frame rail 34, a drive assembly 52, and second support member 62 to allow the slide-out compartment 16 to be moved between the retracted position and the extended position. According to an exemplary embodiment, first support member 60 extends through holes 37 in both first frame rail 32 and second frame rail 34 and is coupled to first frame rail 32 and second frame rail 34 using mounting brackets 56.

First support member 60 is positioned horizontally or generally parallel to main floor 26. According to other exemplary embodiments, first support member 60 may be coupled to first frame rail 32 and second frame rail 34 so that first support member 60 is sloped relative to main floor 26 as shown in U.S. Pat. No. 6,706,721 which is incorporated by reference herein in its entirety. In this embodiment, first support member 60 may be pivotally coupled to first frame rail 32 and vertically adjustable at second frame rail 34. According to still other exemplary embodiments, first support member 60 may optionally be coupled or mounted to the main floor 26 of the RV 10 instead of or in addition to being coupled to first frame rail 32 and second frame rail 34.

Although reference is made to the first support member 60 having a generally C-shaped configuration, one skilled in the art may appreciate that the first support member may have a variety of different configurations. For instance, the first support member 60 may be a tube that is not open on any longitudinal side or it may have a U-shaped configuration, with the side of the first support member having an open portion. According to one exemplary embodiment, first support member 60 may be sized to be received by a conventional vinyl fencepost to form a covering or sheath around first support member 60. The vinyl fencepost may be used to reduce the ability of debris or other foreign matter to become lodged in slide-out mechanism 50.

A second support member 62 is provided that is slidably engaged with first support member 60 and may be coupled to slide-out compartment 16 (e.g., coupled to slide-out floor 40). According to an exemplary embodiment, second support member 62 is a thin walled member with a generally C-shaped cross-section and is sized to fit within first support member 60. Second support member 62 comprises an engaging portion 63 that is generally aligned with the open side of first support member 60 and cooperates with drive assembly 52 to move second support member 62 relative to first support member 60. In another embodiment, drive assembly 52 cooperates with second support member 62 to move second support member 62 in the same direction as a longitudinal axis defined by first support member 60 (i.e., the second support member 62 may move along the same longitudinal axis as defined by the first support member 60 or, in other words, in parallel with the longitudinal axis defined by the first support member 60).

By positioning first support members 60 and second support members 62 substantially horizontally, a number of advantages are realized. First support member 60 may be able to extend through holes 37 in both first frame rail 32 and second frame rail 34, which allows second support member 62 to travel further relative to first support member 60, thus allowing larger slide-out compartments 16 to be used with RV 10. In addition, second support member 62 does not hang down as low when slide-out compartment 16 is in the extended position as it would if it were sloped.

First support member 60 and second support member 62 may be made of any suitable material that provides the strength, etc. to move and support a particular slide-out compartment 16. According to one exemplary embodiment, first support member 60 and second support member 62 are made from a ferrous material such as steel. According to another exemplary embodiment, first support member 60 and second support member 62 may be made of any other suitable material (e.g., lightweight composites, aluminum, carbon fiber, plastics, etc.). Slide-out system 18 and its various components may be painted or otherwise provided with a protective coating to guard against corrosion and/or other similar weather and/or use related wear problems.

In moving between the retracted position and the extended position, slide-out floor 40 may move in a direction that is generally perpendicular to main floor 26 so that slide-out floor 40 and main floor 26 are flush when slide-out compartment 16 is in the extended position. According to one exemplary embodiment, as described earlier, in order to account for the vertical movement of slide-out floor 40, first support member 60 and second support member 62 may be sloped relative to main floor 26. According to another exemplary embodiment, shown in the FIGS. 8-9, second support member 62 may be coupled to slide-out floor 40 using the mounting assembly 64 that allows slide-out floor 40 (as well as slide-out compartment 16) to move vertically relative to second support member 62 and main body 12. According to still another exemplary embodiment, slide-out floor 40 may move in a plane that is substantially parallel to the plane of main floor 26 so that when slide-out floor 40 is in the extended position, slide-out floor 40 is not substantially level with main floor 26. In this embodiment, mounting assembly 64 would not need to allow for vertical movement of slide-out floor 40.

Mounting assembly 64 comprises an insert which is fixably coupled to the second support member 62, a second mounting member 70 fixably coupled to slide-out floor 40, and a stop member, shown schematically as bolt 72. The insert is sized to fit within second support member 62. A first mounting member 68 is coupled to insert 66. First mounting member 68 and second mounting member 70 cooperate telescopically to allow slide-out floor 40 to move relative to second support member 62. Insert 66 may be secured inside second support member 62 using fasteners such as bolts, welding, etc. A bracket such as an angle iron may be provided to couple second mounting member 70 to slide-out compartment 16. It should be appreciated that first mounting member 68 and second mounting member 70 may be coupled to second support member 62 and slide-out compartment 16 in many different ways.

Figure 8:
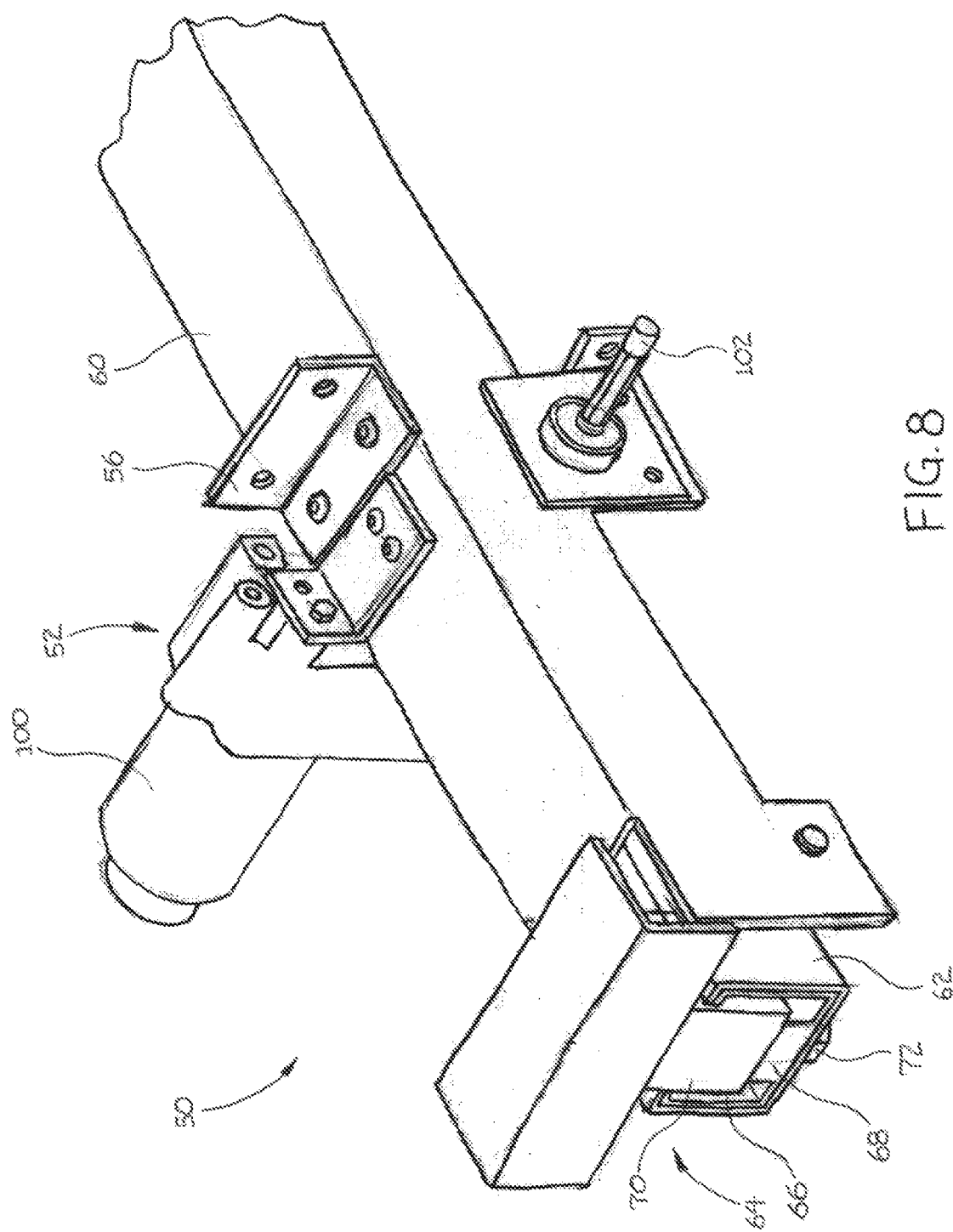
FIG. 8 is a perspective top view of a portion of a slide-out mechanism which is used to move a slide-out compartment between a retracted position and an extended position according to another exemplary embodiment.
Figure 9:
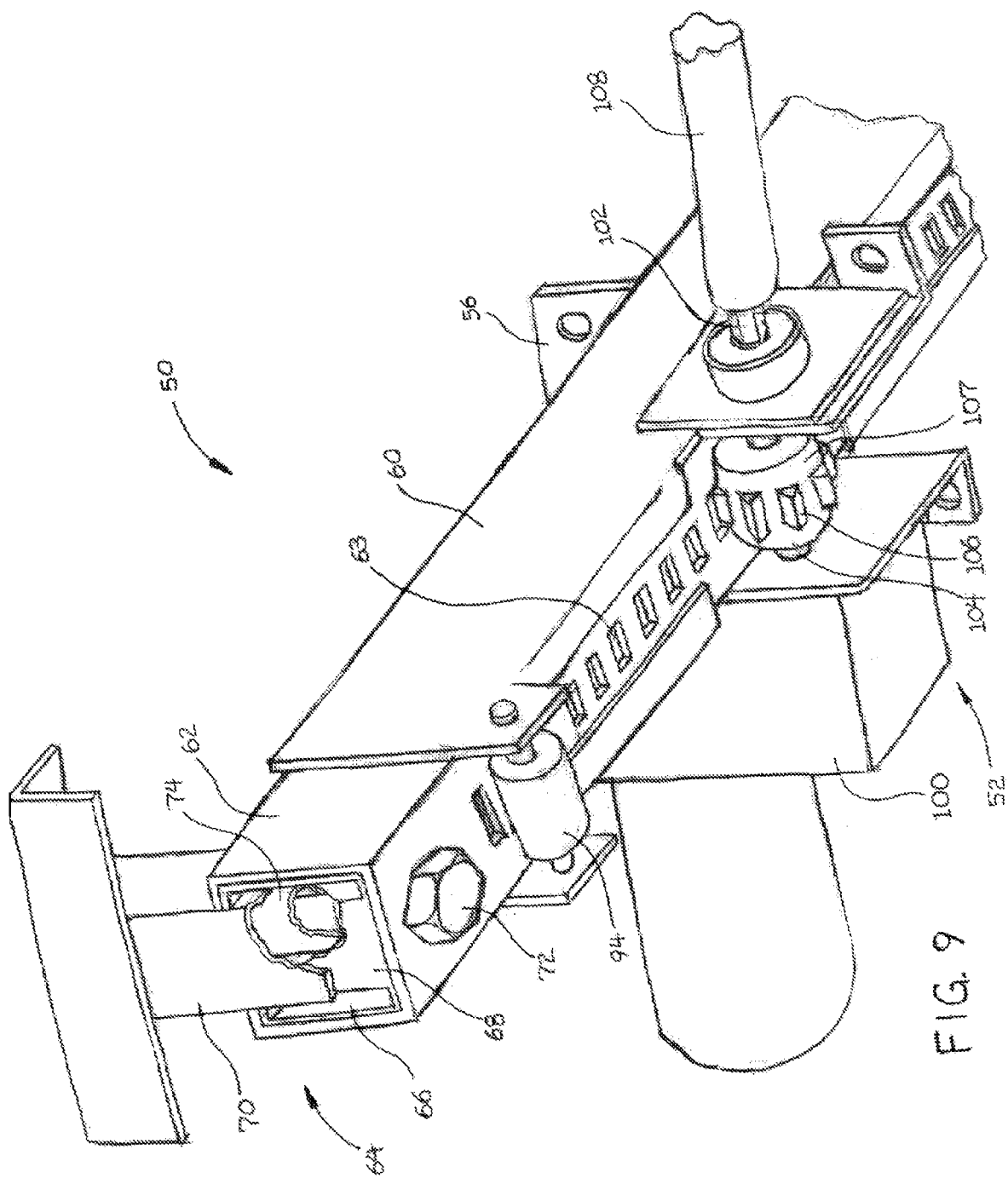
FIG. 9 is a perspective bottom view of the slide-out mechanism of FIG. 8.
Figure 10:
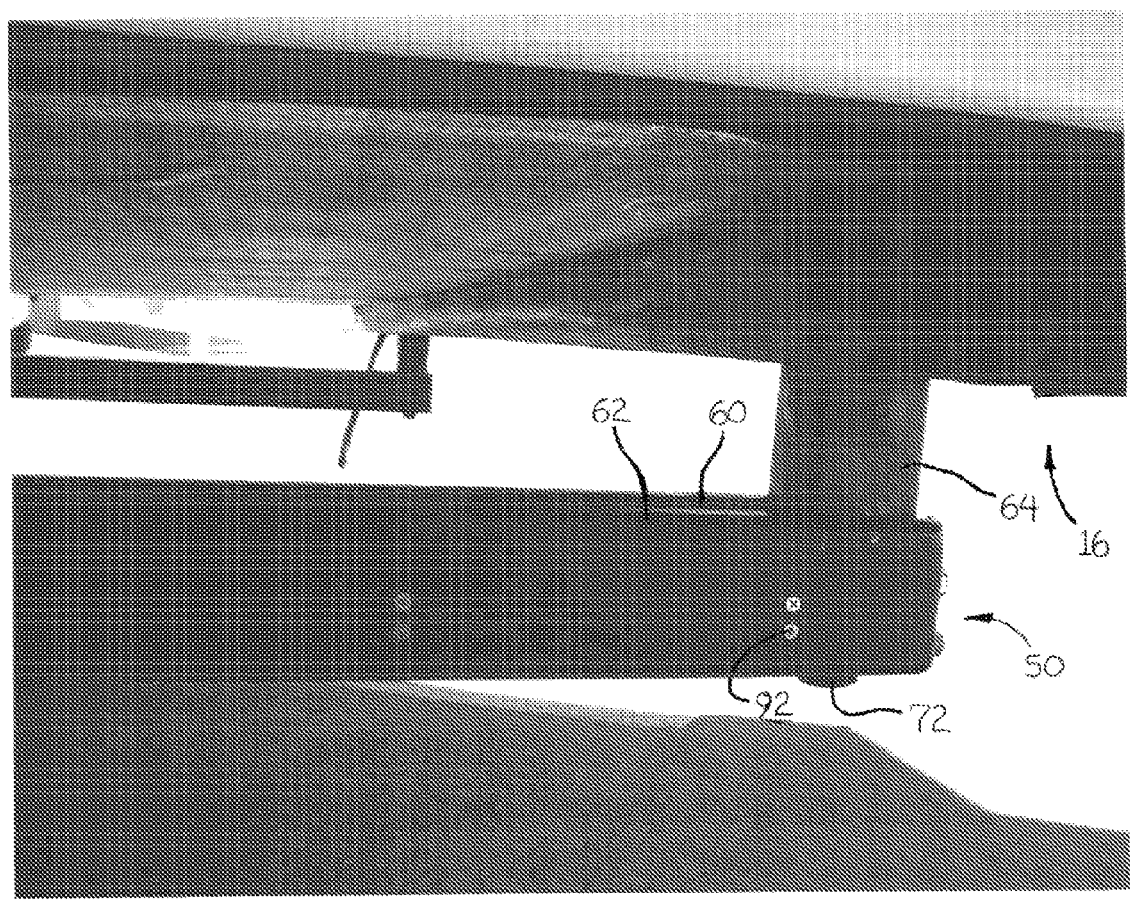
FIG. 10 is a perspective view of the slide-out mechanism of FIG. 8 coupled to a slide-out compartment.

Referring especially to FIGS. 8-10 and according to one exemplary embodiment, bolt 72 is a stop member that is provided as part of mounting assembly 64 to adjust the position of slide-out compartment 16 in the extended position. In one embodiment, a bolt 72 may be used that extends through the underside of second support member 62 and upward into first mounting member 68. Second mounting member 70 rests on the top of bolt 72 when slide-out compartment 16 is in the extended position. Bolt 72 may be adjusted to adjust the position of slide-out compartment 16 relative to second support member 62.

According to one exemplary embodiment, a biasing member may be disposed between first mounting member 68 and second mounting member 70 (with or without the use of bolt 72). The biasing member may be used to bias slide-out compartment 16 upward as slide-out compartment 16 moves from the extended position to the retracted position. The biasing member may be a spring such as a steel spring, elastomeric spring (e.g., urethane spring), etc. In this embodiment, the first mounting member 68 and the second mounting member 70 may be square tubes which fit inside each other with the biasing member being positioned inside the tubes. As the tubes telescope together when the slide-out compartment 16 is moved from the retracted position to the extended position, the biasing member is compressed. Wear guides may be provided between the first and second mounting members 68, 70 to minimize the friction between first and second mounting members 68, 70 as they move relative to each other. The wear guides may be made out of low friction plastic material or any other suitable material. According to another exemplary embodiment, a rail may be coupled to the side of slide-out compartment 16 and a wedge member coupled to the side of second wall 24 that receives slide-out compartment 16. As slide-out compartment 16 is moved from the extended position to the retracted position, the rail engages the wedge shaped member to provide additional force to lift slide-out compartment 16.

According to one exemplary embodiment, mounting assembly 64 may be configured to allow slide-out compartment 16 to be moved side to side in order to center slide-out compartment 16 in the opening in second wall 24. For example, second mounting member 70 may include slots that run parallel to the opening in second wall 24 that are configured to receive bolts to allow slide-out compartment 16 to be moved in a direction that is parallel to second wall 24 (i.e., side to side). Once slide-out compartment 16 is in position, the bolts may be tightened so that slide-out compartment 16 is substantially prevented from moving parallel to second wall 24.

Figure 12:
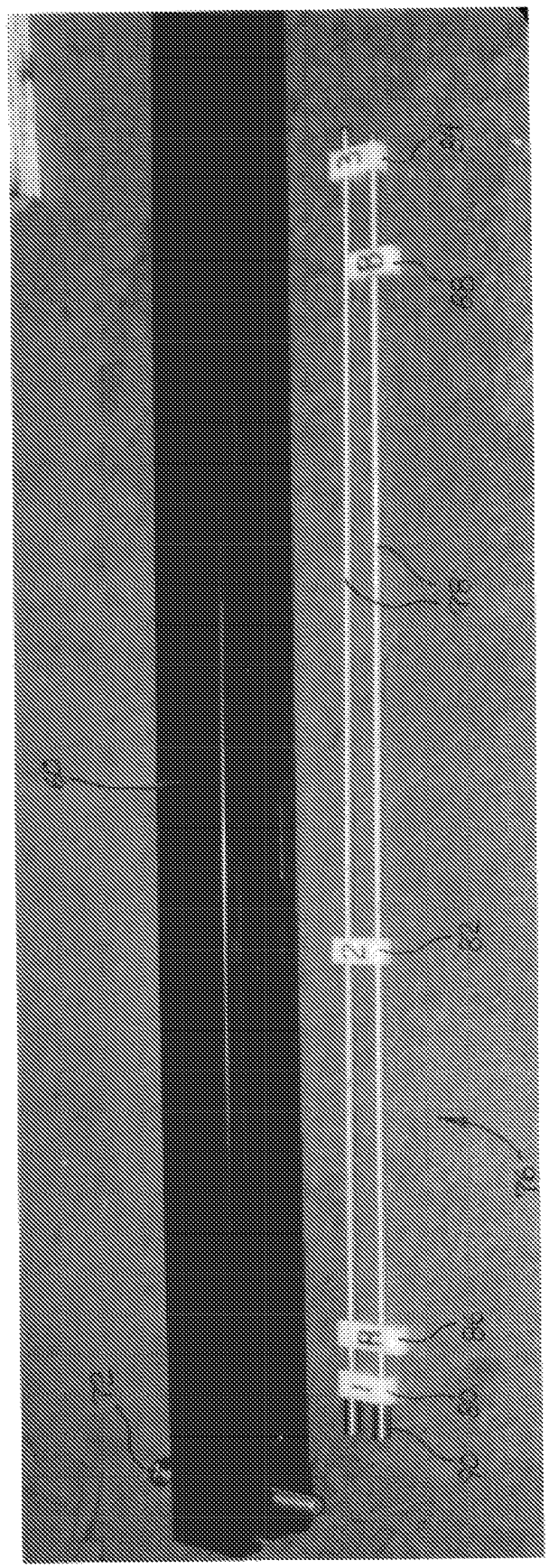
FIG. 12 is a partially exploded perspective view of a slide-out mechanism having a stop position adjustment assembly which is used to stop the slide-out mechanism in the retracted position and/or the extended position.

Referring to FIG. 12, a stop position adjustment assembly 76 is shown. Stop position adjustment assembly 76 may be provided to adjust the position that second support member 62 stops at in the retracted position and/or the extended position. Stop position adjustment assembly 76 includes two threaded rods 78, guides 80, 82, 84 and stops 86, 88. Guides 80, 82, 84 are used to couple threaded rods 78 to the interior side wall of second support member 62. Guides 80, 82, 84 allow both of the threaded rods 78 to move freely in a rotary manner relative to guides 80, 82, 84. The ends of the threaded rods 78 are configured so that they abut against guides 80, 84 to prevent the threaded rods 78 from moving lengthwise. For example, clips may be attached to a grooved section of threaded rods 78 on each side of guides 80, 84 to prevent threaded rod 78 from moving lengthwise. In another embodiment, guides 80, 84 may be positioned at the ends of threaded rods 78 where the cross section of threaded rods 78 is larger so that the larger cross section portions are snug against guides 80, 84, thus preventing longitudinal movement of threaded rods 78.

On the end of threaded rods 78 near guide 80, couplers 90 are attached to threaded rod 78 (threaded on, welded, etc.). Couplers 90 are designed to receive an allen wrench on the end. Thus, when stop position adjustment assembly 76 is coupled to the interior wall of second support member 62, an allen wrench may be inserted between the wall of the second support member 62 and the first mounting member 68 to turn threaded rods 78. Stop 88 has a threaded hole that engages the lower threaded rod 78 shown in FIG. 12. As the lower threaded rod 78 rotates, stop 88 moves longitudinally. Stop 86 is configured to have one threaded hole that receives the upper threaded rod 78 that stop 88 is not coupled to and one unthreaded hole which receives the threaded rod 78 that stop 88 is coupled to. Thus, as the lower threaded rod 78 rotates, stop 86 does not move. However, as the upper threaded rod 78 that is threadably coupled to stop 86 rotates, stop 86 also rotates.

Stops 86, 88 are configured to contact sensors such as microswitches positioned in the interior of first support member 60. According to one exemplary embodiment, two microswitches may be positioned back to back so that when slide-out compartment 16 is extended, stop 88 contacts one microswitch and stops further movement of slide-out compartment 16 and when slide-out compartment 16 is retracted, stop 86 contacts the other microswitch and stops further movement of slide-out compartment 16. The microswitches may be coupled to a bracket that extends through the top wall of first support member 60 at a position near where a motorized activation assembly or motor assembly 100 is coupled to first support member 60. The bracket and the microswitches do not interfere with movement of the second support member 62 because the upper side of second support member 62 is the open side of the C-channel. By adjusting stops 86, 88 the position of slide-out compartment 16 in the retracted position and/or the extended position may be adjusted to provide the desired seal 46 between slide-out compartment 16 and second wall 24.

Also shown in FIG. 10, fasteners 92 are shown as flat-headed bolts or screws. Fasteners 92 are configured to couple stop position adjustment assembly 76 to the inside of second support member 62. According to one exemplary embodiment, fasteners 92 are received in countersunk holes so that fasteners 92 do not protrude outward from the outer surface of second support member 62 and interfere with the movement of second support member 62 as it telescopes into and out of first support member 60.

As shown in FIG. 9, a support assembly 94 may be rotatably coupled at the end of first support member 60. Support assembly 94 provides support for second support member 62 as it extends from the end of first support member 60 and moves relative to first support member 60. Support assembly 94 includes a roller that supports the second support member 62. The end of second support member 62 opposite of mounting assembly 64 may further include an opening, hole, or aperture through which extends a rear roller, rotating support member, or movable support (not shown; see documents incorporated by reference).

Drive assembly 52 is provided to move second support member (and, in turn, slide-out compartment 16) relative to first support member 60. According to an exemplary embodiment, drive assembly 52 comprises a motor assembly 100, a drive shaft 102, and a driving member 104 (e.g., toothed wheel, sprocket, gear, etc.) which includes one or more support surfaces or support portions 107 and is coupled to drive shaft 102.

One embodiment of the motor assembly 100 is depicted in FIGS. 8-9. As shown, motor assembly 100 is depicted as being coupled directly to drive shaft 102 without the use of a gear reduction assembly provided separately from motor assembly 100. As shown, motor assembly 100 includes a housing or motor housing that cooperates with an electric motor. The housing includes one or more apertures that may receive fasteners to couple motor assembly 100 to first support member 60 and/or frame 14.

According to one exemplary embodiment, the motor included with motor assembly 100 is at least about a ⅛ horsepower motor, or, desirably, at least about a 3/16 horsepower motor, or, suitably at least about ¼ horsepower motor. Also, the motor assembly 100 may provide a gear reduction ratio of at least about 100:1, or, desirably, at least about 180:1, or, suitably, at least about 200:1. A 200:1 ratio may provide the motor with desirable speed versus torque characteristics for moving slide-out mechanism 50. The motor may be configured to rotate the drive shafts between about 15 rpm and 35 rpm, or, desirably, between about 20 rpm and 30 rpm, or suitably, about 25 rpm. A motor having these characteristics may be custom designed, or such a motor may be obtained from Stature Electric Inc. of 22223 Fisher Rd. Watertown, N.Y. 131041 as part number 5029.002. The motor may be a direct current motor.

Driving member 104 is a generally cylindrical body that comprises a plurality of teeth or engaging features 106 and may comprise support surfaces 107. Support surfaces 107 may be generally cylindrical in shape and approximately the same diameter as the root diameter of driving member 104. Support surfaces 107 may cooperate with second support member 62 to support second support member 62 as it extends from first support member 60. According to one exemplary embodiment, support assembly 94 may not be provided and support surfaces 107 on driving member 104 may support second support member 62. According to another exemplary embodiment, support assembly 94 and driving member 104 may be used in combination to provide even more support to second support member 62. According to still other exemplary embodiments, driving member 104 may not comprise support surfaces 107 and may still be used without support assembly 94. There are a wide variety of configurations and embodiments that may be used to support second support member 62 as it moves relative to first support member 60.

As shown in the FIGS., second support member 62 includes the engaging portion 63 which cooperates with drive assembly 52 to move second support member 62 relative to first support member 60. According to one exemplary embodiment, engaging portion 63 of second support member 62 includes one or more holes, slots, openings, spaces, or apertures formed in a side wall (e.g., lower side wall, etc.) of second support member 62. The engaging features 106 on the driving member 104 cooperate with the holes 63 facilitate movement of second support member 62 relative to first support member 60. The holes may have any configuration so long as the holes cooperate with and at least partially receive at least a portion of driving member 104 to move second support member 62. In one configuration, each hole may be configured to receive all or a portion of engaging features 106. The holes may be formed in second support member 62 by stamping, molding, machining, laser cutting, etc.

According to other exemplary embodiments, engaging portion 63 and the corresponding engaging features 106 of driving member 104 may be configured in a variety of ways to provide the desired movement. For example, in one embodiment, driving member 104 may be a sprocket that is configured to cooperate with engaging portion 63 that comprises a roller chain. The roller chain may be welded, bolted, etc. to second support member 62. In another embodiment, driving member 104 may include engaging features 106 that are holes which are configured to cooperate with a plurality of projections on engaging portion 63 of second support member 62. In yet another embodiment, driving member 104 may be a gear and engaging portion 63 may comprises a rack which includes a plurality of teeth that cooperate with the teeth on the gear.

If two or more slide-out mechanisms 50 are provided, a single motor assembly 100 may be used to drive multiple driving members 104 and a coupling shaft 108 may be provided to couple multiple drive shafts 102 together.

Figure 11:
FIG. 11 is a perspective view of a slide-out mechanism extending through the frame of a vehicle.

Referring to FIG. 11 and according to one exemplary embodiment, slide-out system 18 may have the electronics coupled to slide-out mechanism 50 and/or the vehicle near where the motorized activation assembly is positioned. In this way, slide-out mechanism 50 can be shipped as a single unit so that the only wiring that needs to be done when it is installed is to connect power to the unit. Also, a switch may be provided with the electronics to allow slide-out system 18 to be operated at a position on the outside of the vehicle for servicing and repair purposes. The electronics may include one or more programmable logic microchips. The electronics may also be positioned in a housing, box, or receptacle to protect the electronics from the elements.

One or more take-up assemblies 54 may be provided to assist the vertical movement of the slide-out compartment 16 between the extended position and the retracted position. According to one exemplary embodiment, take-up assembly 54 comprises a flexible member 110 (e.g., cable, roller chain, rope, strap, etc.), a plurality of bearing members, pulleys or wheels 112, 114 about which flexible member 110 pivots, and a plurality of brackets 116, 118 that are configured to couple distal ends of flexible member to slide-out compartment 16.

Figure 13:
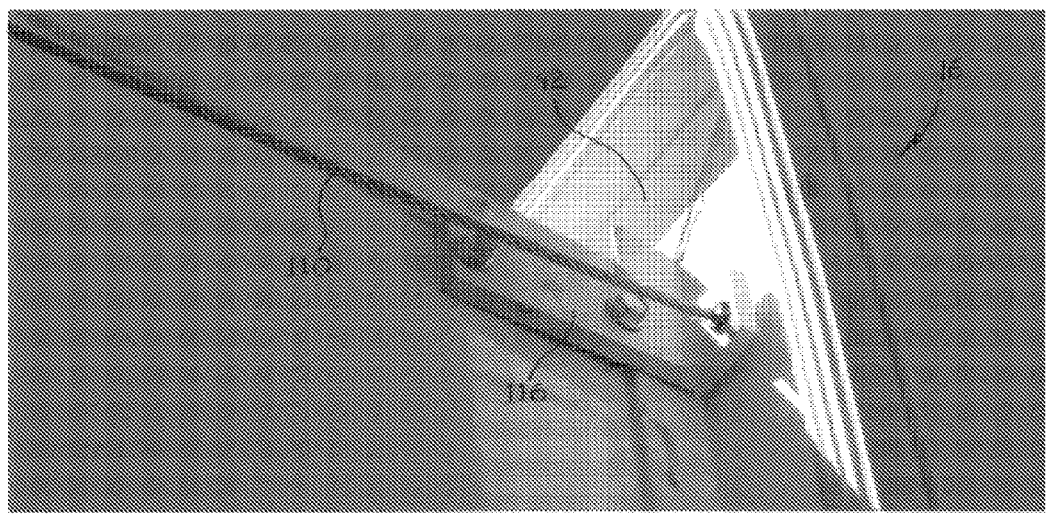
FIG. 13 is a perspective view of a portion of a take-up assembly with a flexible member configured to bias the slide-out mechanism upward and/or assist in sealing the slide-out compartment to the vehicle.
Figure 14:
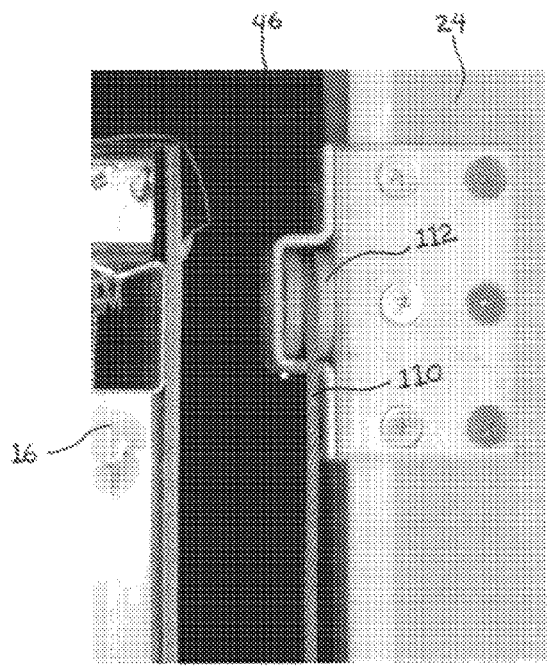
FIG. 14 is a perspective view of a pulley which is used to guide movement of the flexible member from FIG. 14.
Figure 15:
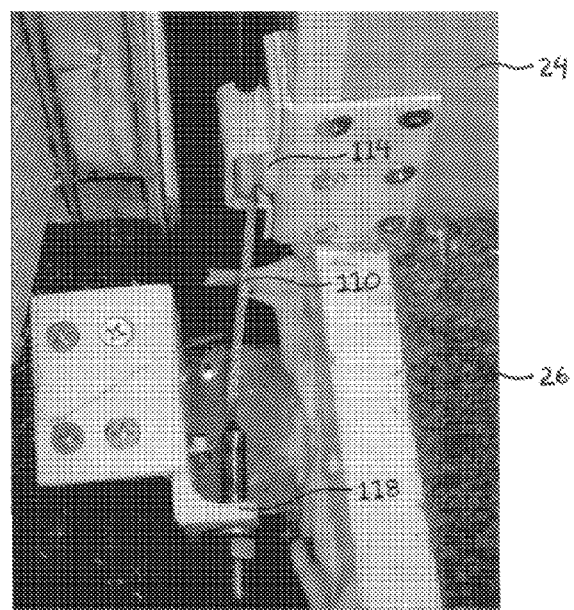
FIG. 15 is a perspective view of another pulley which is used to guide movement of the flexible member from FIG. 16 and a bracket used to couple the flexible member to the slide-out compartment.

According to an exemplary embodiment, a first pulley 112 is coupled to second wall 24 near the top of the opening in second wall 24 proximate to ceiling 28 and a second pulley 114 is coupled to second wall 24 near the bottom of the opening in second wall 24 proximate to main floor 26. Thus, pulleys 112, 114 are generally stationary (other than they rotate) and guide movement of flexible member 1 10. Flexible member 110 may be coupled to slide-out compartment 16 in any number of suitable ways (e.g., bolts, screws, etc. through a bracket and so on). For example, the flexible member 110 may be coupled to the slide-out compartment 16 in a fashion that allows the flexible member to be tightened or adjusted (e.g., flexible member is attached to a threaded rod that engages a nut attached to the slide-out compartment to allow the tension in the flexible member 110 to be adjusted). Flexible member 110 is coupled to third wall 42 proximate to slide-out ceiling 44 with a bracket 116 as shown in FIG. 13. Flexible member 110 extends from bracket 116 to pulley 112 as shown in FIG. 14, down to pulley 114, and then over to bracket 118 that is configured to couple flexible member 110 to slide-out floor 40 as shown in FIG. 15. According to an exemplary embodiment, two take-up assemblies are provided and generally form an L shape on either side of slide-out compartment 16, as shown in FIGS. 13-20.

Figure 16:
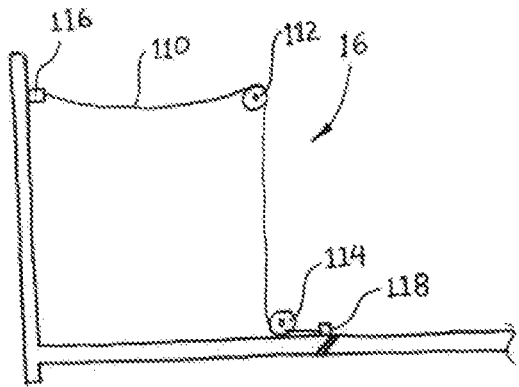
FIGS. 16-20 are side views of various configurations of flexible members which are used to lift or bias the slide-out compartment upward as it is retracted and/or form a tight seal between the slide-out compartment and the vehicle.
Figure 17:
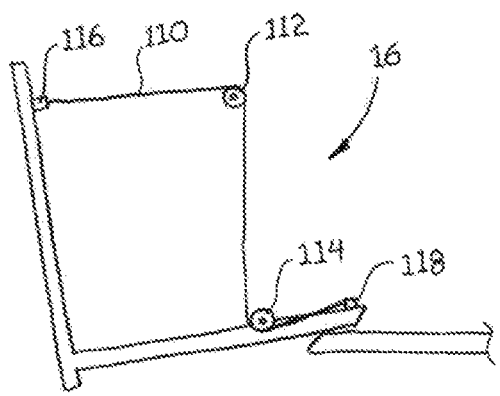
Figure 18:
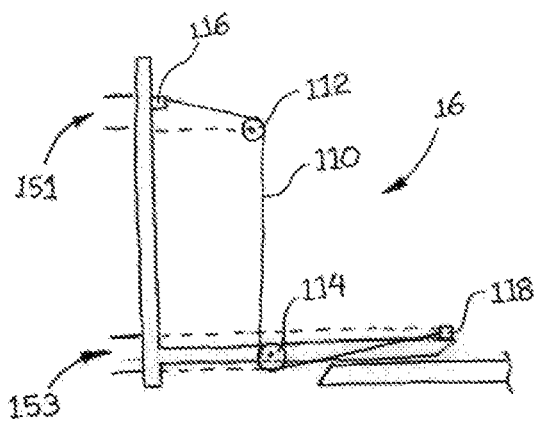

Referring to FIGS. 16-18, the manner in which take-up assemblies 54 is believed to lift slide-out compartment 16 as slide-out compartment 16 is moved from an extended position to a retracted position is shown. Flexible member 110 is attached to slide-out compartment 16 at both ends and pulleys 112, 114 are positioned so that flexible member 110 extends substantially horizontal from bracket 116 to pulley 112. When slide-out compartment 16 is extended as shown in FIG. 16, flexible member 110 hangs loose. However, as it is retracted, brackets 116, 118 move upward relative to pulleys 112, 114, which remain stationary. As brackets 116, 118 move upward, flexible member 110 is no longer directly horizontal between bracket 116 and pulley 112 and between bracket 118 and pulley 1 14. Rather, flexible member 110 is now positioned at a slight angle between brackets 116, 118 and pulleys 112, 114 (the vertical distance between the brackets and the pulleys can be seen in FIG. 18 at reference numerals 151, 153). This angle causes flexible member 110 to tighten and thus pull third wall 42 of slide-out compartment 16 forward and upward.

Figure 19:
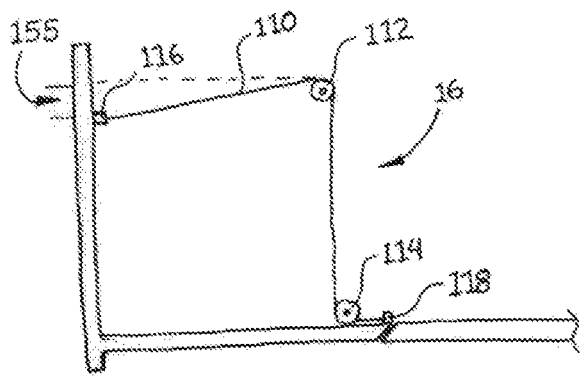
Figure 20:
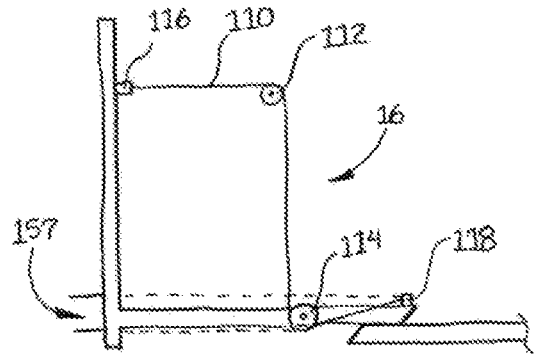

Referring to FIGS. 19-20, another exemplary embodiment is shown where bracket 116 is lower than pulley 112 (as shown by reference numeral 155) and bracket 118 is substantially horizontal to pulley 114 when slide-out compartment 16 is extended. As slide-out compartment 16 is retracted, bracket 116 moves upward so that it is substantially horizontal to pulley 112 and bracket 118 moves upward so that it is above pulley 114 (as shown by reference numeral 157) a distance that is substantially equal to the distance that bracket 116 was below pulley 112 when slide-out compartment 16 was in the extended position. In this embodiment, the tension in flexible member 110 remains the same no matter what position slide-out compartment 16 is in. It should be appreciated that numerous other embodiments of a take-up assembly 54 may also be used. Such various embodiments may provide a flexible member 110 where the tension in flexible member 110 is varied based on the position of brackets 116, 118 and pulleys 112, 114. Also, it should be appreciated, that according to still another exemplary embodiment, flexible member 110 may be coupled to the bottom of third wall 42 and to the top of slide-out compartment 16 proximate to main body 12 (i.e., the mirror image of how the flexible member 110 is coupled to the slide-out compartment 16 in FIG.16).

Slide-out system 18 is configured to occupy a minimum amount of space and increase the available living area and/or the ground clearance of the RV 10 while providing the requisite strength and functionality to move the slide-out compartment 16. Additionally, in one exemplary embodiment slide-out system 18 uses a modular configuration where one or more slide-out mechanisms 50 may be used to extend or retract slide-out compartment 16. More or fewer slide-out mechanisms 50 may be provided depending upon the size and configuration of slide-out compartment 16 (e.g., dinette slide-out room, bedroom slide-out room, etc.). According to other exemplary embodiments, a slide-out system 18 comprising two, three, four or more slide-out mechanisms 50 may be provided for a relatively large slide-out compartment 16. According to still other exemplary embodiments, a slide-out system 18 comprising a single slide-out mechanism 50 may be provided for a relatively small slide-out compartment. One skilled in the art will appreciate that various numbers of slide-out mechanisms may be utilized in various embodiments of slide-out system 18.

Moreover, various embodiments of slide-out system 18 may be used that extend and/or retract various distances. For example, in those embodiments where slide-out system 18 is used to extend and/or retract a slide-out patio, slide-out system 18 may extend and/or retract a distance that is more or less then the distance used to move the slide-out compartment 16.

Regardless of the number or size of slide-out mechanisms 50 used, substantially similar slide-out mechanisms 50 may be coupled together and configured to operate in concert with each other. According to one exemplary embodiment, each slide-out mechanism 50 may be configured to move simultaneously and thus move slide-out compartment 16 accordingly. Furthermore, the modular characteristics of slide-out system 18 improves manufacturing and installation efficiencies by using similar components for multiple embodiments and/or configurations. Further, the configuration of slide-out system 18 allows for simplified installation and repair, particularly in those situations where slide-out system 18 is installed to replace a prior system that has failed or been removed.

While a number of embodiments and modifications thereto are disclosed herein, it should be understood that these embodiments should be viewed as simply a few selected examples of various mechanisms that may be used to move one or more slide-out compartments or slide-out patios.

Illustrative Embodiments

Reference is made in the following to a number of illustrative embodiments of the subject matter described herein. The following embodiments illustrate only a few selected embodiments that may include the various features, characteristics, and advantages of the subject matter as presently described. Accordingly, the following embodiments should not be considered as being comprehensive of all of the possible embodiments. Also, features and characteristics of one embodiment may and should be interpreted to equally apply to other embodiments or be used in combination with any number of other features from the various embodiments to provide further additional embodiments, which may describe subject matter having a scope that varies (e.g., broader, etc.) from the particular embodiments explained below. Accordingly, any combination of any of the subject matter described herein is contemplated.

According to one embodiment, a recreational vehicle comprises: a frame which includes a first frame rail and a second frame rail; a first floor supported by the frame; a second floor movable between a retracted position where the second floor is positioned adjacent to the first floor and an extended position where the second floor is at least substantially level with the first floor; a first support member which extends through the first frame rail and the second frame rail, the first support member being at least substantially parallel to the first floor; and a second support member supported by the first support member and coupled to the second floor, the second support member being movable relative to the first support member to move the second floor between the retracted position and the extended position.

According to another embodiment, a land vehicle comprises: a first floor; a second floor movable between a retracted position where the second floor is positioned adjacent to the first floor and an extended position where the second floor is at least substantially level with the first floor; a first support member coupled to the vehicle beneath the first floor; a second support member supported by the first support member and coupled to the second floor to allow the second floor to move vertically relative to the second support member and thus allow the second floor to be at least substantially level with the first floor in the extended position, the second support member being movable relative to the first support member to move the second floor between the retracted position and the extended position; and an elastomeric biasing member positioned between the second floor and the second support member to bias the second floor upward as the second floor moves from the extended position to the retracted position.

According to another embodiment, a land vehicle comprises: a first floor; a second floor movable between a retracted position where the second floor is positioned adjacent to the first floor and an extended position where the second floor is at least substantially level with the first floor; a first support member coupled to the vehicle beneath the first floor; a second support member including a plurality of holes, the second support member being supported by the first support member and coupled to the second floor, the second support member being movable relative to the first support member to move the second floor between the retracted position and the extended position; and a gear which cooperates with the plurality of holes in the second support member to move the second support member relative to the first support member; wherein the second support member is coupled to the second floor to allow the second floor to move vertically relative to the second support member as the second floor moves between the retracted position and the extended position.

According to another embodiment, a recreational vehicle comprises: a frame which includes a first frame rail and a second frame rail, the first frame rail and the second frame rail each including a plurality of openings which are provided to decrease the weight and/or increase the strength of the frame; a first floor supported by the frame; a second floor movable between a retracted position where the second floor is positioned adjacent to the first floor and an extended position where the second floor is at least substantially level with the first floor; a first support member which extends through one of the plurality of openings in the second frame rail; and a second support member supported by the first support member and coupled to the second floor, the second support member being movable relative to the first support member to move the second floor between the retracted position and the extended position. The first support member may extend through one of the plurality of openings in the first frame rail. The plurality of openings may be substantially similar (substantially identical or identical) in size. The plurality of openings may each include a lip which extends around the opening. The plurality of openings may each include a lip which extends outward from a planar surface of the first frame rail and the second frame rail. The first support member may be at least substantially parallel to the first floor. The second support member may be coupled to the second floor to allow the second floor to move vertically relative to the second support member as the second floor moves between the retracted position and the extended position.

According to another embodiment, a recreational vehicle comprises: a first floor; a second floor movable between a retracted position where the second floor is positioned adjacent to the first floor and an extended position; a first support member coupled to the vehicle beneath the first floor; a second support member supported by the first support member, a distal end of the second support member being coupled to the second floor, the second support member being movable relative to the first support member to move the second floor between the retracted position and the extended position; a stop position adjustment assembly coupled to the second support member, the stop position adjustment assembly being used to adjust the location of the retracted position and/or the extended position of the second floor; wherein the stop position adjustment assembly is adjustable at the distal end of the second support member. The stop position adjustment assembly may include a position sensor coupled to the first support member, the position sensor being used to determine the position of the second floor in the retracted position and/or the extended position.

According to another embodiment, a recreational vehicle comprises: a first floor; a second floor movable between a retracted position where the second floor is positioned adjacent to the first floor and an extended position; a first support member coupled to the vehicle beneath the first floor; a second support member supported by the first support member and coupled to the second floor, the second support member being movable relative to the first support member to move the second floor between the retracted position and the extended position; a position sensor coupled to the first support member; and a stop coupled to the second support member, the stop being positioned to contact the position sensor when the second floor reaches the retracted position and/or the extended position; wherein the stop is adjustable to adjust the location of the retracted position and/or the extended position of the second floor. The position sensor may be a first position sensor and the stop is a first stop, the recreational vehicle comprising a second position sensor coupled to the first support member and a second stop coupled to the second support member, wherein the first position sensor and the first stop are used to adjust the retracted position of the second floor and the second position sensor and the second stop are used to adjust the extended position of the second floor.

According to another embodiment, a recreational vehicle comprises: a first floor; a second floor movable between a retracted position where the second floor is positioned adjacent to the first floor and an extended position; a plurality of first support members coupled to the vehicle beneath the first floor, the plurality of first support members being at least substantially parallel to the first floor; a plurality of second support members supported by the first support members and coupled to the second floor; wherein the plurality of second support members may be selectively moved in accordance with a first configuration where the plurality of second support members move in unison or a second configuration where the plurality of second support members may be moved independent of each other; wherein the plurality of second support members are coupled to the second floor to allow the second floor to move vertically relative to the second support member; and wherein the location of the retracted position and the extended position is adjustable. Each of the plurality of second support members may include an engaging portion, the recreational vehicle may comprise a drive assembly including a plurality of gears which cooperate with the engaging portions from a corresponding second support member to move the second support members relative to the first support members and thus move the second floor between the retracted position and the extended position, the drive assembly being used to move the plurality of gears in unison, the drive assembly also being selectively telescopically adjustable between a first orientation where the plurality of gears move in unison and a second orientation where one of the plurality of gears is movable independent of another one of the plurality of gears. The recreational vehicle may comprise an adjustable stop positioned between the second support member and the second floor, the adjustable stop being used to vary the position of the second floor relative to the second support member in the extended position.

According to another embodiment, a recreational vehicle comprises: a first floor; a slide-out compartment including a second floor movable between a retracted position where the second floor is positioned adjacent to the first floor and an extended position where the second floor is at least substantially level with the first floor; and a flexible member coupled between an outer portion and an inner portion (e.g., opposite sides) of the slide-out compartment; wherein the flexible member is configured to bias the slide-out compartment upward as the slide-out compartment moves from the extended position to the retracted position and/or affirmatively seal the slide-out compartment and the vehicle when the slide-out compartment is in the retracted position.

According to another embodiment, a vehicle comprises: a first floor; a slide-out compartment including a second floor, the slide-out compartment being movable between a retracted position where the second floor is positioned adjacent to the first floor and an extended position; and a flexible member fastened to the slide-out compartment, the flexible member being configured to engage a pulley which is coupled to the vehicle. The vehicle may comprise a slide-out opening, the slide-out compartment being positioned in the slide-out opening, wherein the pulley is coupled to the vehicle adjacent to the slide-out opening. The pulley may be a first pulley and the vehicle may comprise a second pulley coupled to the vehicle adjacent to the slide-out opening, the first pulley being positioned above the second pulley. The pulley may be a first pulley and the vehicle may comprise a second pulley coupled to the vehicle, the first pulley being positioned above the second pulley, and wherein the flexible member is coupled to the slide-out compartment at a first location and a second location, the flexible member being configured to extend from the first location to the first pulley, downwardly from the first pulley to the second pulley, and from the second pulley to the second location. The second floor may be at least substantially flush with the first floor when the slide-out compartment is in the extended position. The vehicle may comprise: a first support member coupled to the vehicle below the first floor; and a second support member supported by the first support member and coupled to the slide-out compartment, the second support member being configured to move relative to the first support member and thus move the slide-out compartment between the retracted position and the extended position.

According to another embodiment, a vehicle comprises: a first floor; a slide-out compartment including a second floor, the slide-out compartment being movable between a retracted position where the second floor is positioned parallel to the first floor and an extended position where the second floor is at least substantially flush with the first floor; and a flexible member coupled to the slide-out compartment, the flexible member being configured to bias at least a portion of the slide-out compartment upward as the slide-out compartment moves from the extended position to the retracted position. The flexible member may be configured to hold a top portion of the slide-out compartment in sealing engagement with the vehicle when the slide-out compartment is in the retracted position. The flexible member may be fastened to the slide-out compartment.

According to another embodiment, a vehicle comprises: a frame which includes a first frame rail and a second frame rail, the first frame rail and the second frame rail each including a plurality of holes; a first floor supported by the frame; a slide-out compartment including a second floor, the slide-out compartment being movable between a retracted position where the second floor is positioned adjacent to the first floor and an extended position; a first support member which extends through one of the plurality of holes in the second frame rail; and a second support member supported by the first support member and coupled to the slide-out compartment, the second support member being movable relative to the first support member to move the slide-out compartment between the retracted position and the extended position. The first support member may extend through one of the plurality of holes in the first frame rail. The second floor may be at least substantially flush with the first floor when the second floor is in the extended position. The plurality of holes in the first frame rail and the plurality of holes in the second frame rail may be substantially similar in size. The plurality of holes in the second frame rail may each include a lip which extends at least part of the way around each hole. The first support member may be at least substantially parallel to the first floor. The second support member may be coupled to the slide-out compartment to allow at least the second floor to move vertically relative to the second support member as the slide-out compartment moves between the retracted position and the extended position.

According to another embodiment, a vehicle comprising: a first floor; a slide-out compartment including a second floor, the slide-out compartment being movable between a retracted position where the second floor is positioned adjacent to the first floor and an extended position; a first support member coupled to the vehicle below the first floor; a second support member supported by the first support member and coupled to the slide-out compartment, the second support member being movable relative to the first support member to move the slide-out compartment between the retracted position and the extended position; a position sensor coupled to the first support member; and a stop coupled to the second support member, the stop being positioned to contact the position sensor when the slide-out compartment reaches the retracted position and/or the extended position. The position sensor may be a first position sensor and the stop may be a first stop, and wherein the vehicle comprises a second position sensor coupled to the first support member and a second stop coupled to the second support member, wherein the first position sensor and the first stop are used to adjust the retracted position of the second floor and the second position sensor and the second stop are used to adjust the extended position of the second floor. The position of the stop may be adjustable to thereby adjust the location of the retracted position and/or the extended position of the slide-out compartment.

According to another embodiment, a vehicle comprises: a first floor; a slide-out compartment including a second floor, the slide-out compartment being movable between a retracted position where the second floor is positioned adjacent to the first floor and an extended position; a first support member coupled to the vehicle below the first floor; a second support member supported by the first support member, a distal end of the second support member being coupled to the second floor, the second support member being movable relative to the first support member to move the second floor between the retracted position and the extended position; a stop position adjustment assembly coupled to the second support member, the stop position adjustment assembly being used to adjust the location of the retracted position and/or the extended position of the second floor; wherein the stop position adjustment assembly is configured to be adjusted in the vicinity of the distal end of the second support member. The stop position adjustment assembly may include a position sensor coupled to the first support member, the position sensor being used to stop the slide-out compartment in the retracted and/or extended position.

According to another embodiment, a vehicle comprises: a first floor; a slide-out compartment including a second floor, the slide-out compartment being movable between a retracted position where the second floor is positioned adjacent to the first floor and an extended position where the second floor is at least substantially flush with the first floor; a first support member coupled to the vehicle below the first floor; a second support member supported by the first support member and coupled to the slide-out compartment to allow the second floor to move vertically relative to the second support member, the second support member being configured to move relative to the first support member and thus move the slide-out compartment between the retracted position and the extended position; and an elastomeric biasing member positioned between the slide-out compartment and the second support member to bias at least the second floor of the slide-out compartment upward as the slide-out compartment moves from the extended position to the retracted position.

According to another embodiment, a vehicle comprises: a first floor; a slide-out compartment including a second floor, the slide-out compartment being movable between a retracted position where the second floor is positioned adjacent to the first floor and an extended position where the second floor is at least substantially flush with the first floor; a first support member coupled to the vehicle below the first floor; a second support member including a plurality of holes, the second support member being coupled to the slide-out compartment and supported by the first support member; and a gear which cooperates with the plurality of holes in the second support member to move the second support member relative to the first support member and thus move the slide-out compartment between the retracted position and the extended position; wherein the second support member is coupled to the slide-out compartment to allow at least the second floor of the slide-out compartment to move vertically relative to the second support member as the slide-out compartment moves between the retracted position and the extended position.

According to another embodiment, a vehicle comprises: a first floor; a slide-out compartment including a second floor, the slide-out compartment being movable between a retracted position where the second floor is positioned adjacent to the first floor and an extended position; a plurality of first support members coupled to the vehicle below the first floor, the plurality of first support members being at least substantially parallel to the first floor; and a plurality of second support members each of which is supported by a corresponding first support member and is coupled to the slide-out compartment, the plurality of second support members being configured to move relative to the plurality of first support members and thus move the slide-out compartment between the retracted position and the extended position; wherein the plurality of second support members may be moved in accordance with a first configuration where the plurality of second support members move in unison or a second configuration where the plurality of second support members move independent of each other; and wherein the plurality of second support members are coupled to the slide-out compartment to allow at least the second floor of the slide-out compartment to move vertically relative to the plurality of second support members.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either"(or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A vehicle comprising:
   a frame which includes a first longitudinal frame rail and a second longitudinal frame rail, the first longitudinal frame rail and the second longitudinal frame rail each including a plurality of holes;
   a first floor supported by the frame;
   a slide-out compartment including a second floor, the slide-out compartment being movable between a retracted position where the second floor is positioned adjacent to the first floor and an extended position;
   a first lateral support member which extends through one of the plurality of holes in the second longitudinal frame rail; and
   a second lateral support member supported by the first lateral support member and coupled to the slideout compartment, the second lateral support member being movable relative to the first support member to move the slide-out compartment between the retracted position and the extended position.

2. The vehicle of claim 1 wherein the first lateral support member extends through one of the plurality of holes in the first longitudinal frame rail.

3. The vehicle of claim 1 wherein the second floor is at least substantially flush with the first floor when the second floor is in the extended position.

4. The vehicle of claim 1 wherein the plurality of holes in the first longitudinal frame rail and the plurality of holes in the second longitudinal frame rail are substantially similar in size.

5. The vehicle of claim 1 wherein the plurality of holes in the second longitudinal frame rail each include a lip which extends at least part of the way around each hole.

6. The vehicle of claim 1 wherein the first lateral support member is at least substantially parallel to the first floor.

7. The vehicle of claim 1 wherein the second lateral support member is coupled to the slide-out compartment to allow at least the second floor to move vertically relative to the second lateral support member as the slide-out compartment moves between the retracted position and the extended position.

8. A vehicle comprising:
   a first floor;
   a slide-out compartment including a second floor, the slide-out compartment being movable between a retracted position where the second floor is positioned adjacent to the first floor and an extended position;

a first support member coupled to the vehicle below the first floor;

a second support member supported by the first support member and coupled to the slideout compartment, the second support member being movable relative to the first support member to move the slide-out compartment between the retracted position and the extended position;

a position sensor coupled to the first support member; and a stop coupled to the second support member, the stop being positioned to contact the position sensor when the slide-out compartment reaches at least one of the retracted position and the extended position.

9. The vehicle of claim 8 wherein the position sensor is a first position sensor and the stop is a first stop, and wherein the vehicle comprises a second position sensor coupled to the first support member and a second stop coupled to the second support member, wherein the first position sensor and the first stop are used to adjust the retracted position of the second floor and the second position sensor and the second stop are used to adjust the extended position of the second floor.

10. The vehicle of claim 8 wherein the position of the stop is adjustable to thereby adjust the location of at least one of the retracted position and the extended position of the slide-out compartment.

11. A vehicle comprising:

a first floor;

a slide-out compartment including a second floor, the slide-out compartment being movable between a retracted position where the second floor is positioned adjacent to the first floor and an extended position;

a first support member coupled to the vehicle below the first floor;

a second support member supported by the first support member, a distal end of the second support member being coupled to the second floor, the second support member being movable relative to the first support member to move the second floor between the retracted position and the extended position;

a stop position adjustment assembly coupled to the second support member, the stop position adjustment assembly being used to adjust at least one of the location of the retracted position and the extended position of the second floor;

wherein the stop position adjustment assembly is configured to be adjusted in the vicinity of the distal end of the second support member.

12. The vehicle of claim 11 wherein the stop position adjustment assembly includes a position sensor coupled to the first support member, the position sensor being used to stop the slide-out compartment at least one of in the retracted and extended position.

13. A vehicle comprising:

a first floor;

a slide-out compartment including a second floor, the slide-out compartment being movable between a retracted position where the second floor is positioned adjacent to the first floor and an extended position where the second floor is at least substantially flush with the first floor;

a first support member coupled to the vehicle below the first floor;

a second support member supported by the first support member and coupled to the slideout compartment to allow the second floor to move vertically relative to the second support member, the second support member being configured to move relative to the first support member and thus move the slide-out compartment between the retracted position and the extended position; and an elastomeric biasing member positioned between the slide-out compartment and the second support member to bias at least the second floor of the slide-out compartment upward as the slide-out compartment moves from the extended position to the retracted position.

14. A vehicle comprising:

a first floor;

a slide-out compartment including a second floor, the slide-out compartment being movable between a retracted position where the second floor is positioned adjacent to the first floor and an extended position where the second floor is at least substantially flush with the first floor;

a first linear support member coupled to the vehicle below the first floor;

a second linear support member including a plurality of holes, the second linear support member being coupled to the slide-out compartment and supported by the first linear support member; and a gear which cooperates with the plurality of holes in the second linear support member to move the second linear support member relative to the first linear support member and thus move the slideout compartment between the retracted position and the extended position;

wherein the second linear support member is coupled to the slide-out compartment to allow at least the second floor of the slide-out compartment to move vertically relative to the second linear support member as the slide-out compartment moves between the retracted position and the extended position.

* * * * *